Figure 1:
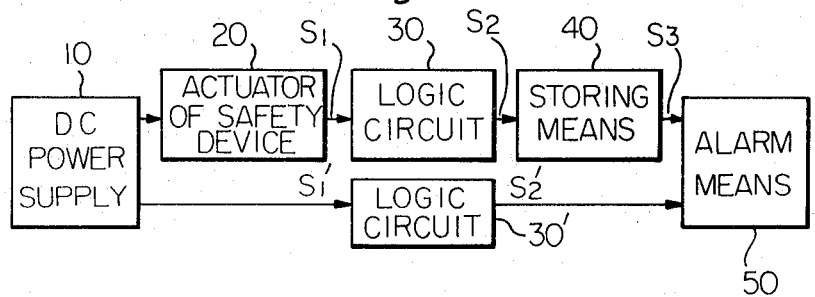

United States Patent [19]
Hosaka et al.

[11] 3,849,759
[45] Nov. 19, 1974

[54] FAULT DETECTOR FOR MOTOR VEHICLE SAFETY DEVICE

[75] Inventors: Akio Hosaka; Kosaku Baba, both of Yokohama; Kiyoshi Wazawa, Fujisawa, all of Japan

[73] Assignee: Nissan Motor Company Limited, Yokohama City, Japan

[22] Filed: Feb. 15, 1973

[21] Appl. No.: 332,762

[30] Foreign Application Priority Data
Feb. 19, 1972  Japan.......................... 47-19982[U]

[52] U.S. Cl. ........... 340/52 R, 340/248 E, 340/250, 307/10 R
[51] Int. Cl. .......................................... G08b 21/00
[58] Field of Search..... 340/52 R, 52 B, 52 D, 52 F, 340/52 H, 53, 59, 60, 244 R, 248 R, 248 E, 250; 307/10 R, 10 LS

[56] References Cited
UNITED STATES PATENTS
3,427,607   2/1969   Oesterle....................... 340/248 A
3,711,827   1/1973   Houseman........................ 340/52 F
3,742,447   6/1973   Sognefest ....................... 340/52 F

*Primary Examiner*—Alvin H. Waring
*Attorney, Agent, or Firm*—Robert E. Burns; Emmanuel J. Lobato; Bruce L. Adams

[57] ABSTRACT

A fault detector for detecting a fault or failure in an actuator of a safety device for a motor vehicle which comprises a fault recording or storing means having an electric fuse and an alarm with a pilot lamp. The fault detector may detect a faulty condition of the actuator even though the actuator could be accidentally temporarily recovered from the faulty condition for some cause or another. This is accomplished by continuing the alarm operation of the alarm in such a manner that, when the electric fuse is burnt out or melted in the event of the fault, the alarm is energized and the pilot lamp is lighted so as to start the alarm operation that stops only when the burnt out fuse is replaced. The fault detector may record or store the faulty condition of the actuator by means of the melted fuse and detect malfunction of the pilot lamp of the alarm.

8 Claims, 2 Drawing Figures

FAULT DETECTOR FOR MOTOR VEHICLE SAFETY DEVICE

The present invention is generally concerned with a safety device for a motor vehicle and, more particularly with an improved detector for reliably detecting a failure or malfunction in an actuator of a safety device for a motor vehicle.

It is well known that a motor vehicle has been equipped with a safety device for protecting vehicle occupants from injuries in the event that the motor vehicle encounters a collision. A known safety device generally includes an actuator comprising an electrically actuable detonator for firing an explosive charge and a collision sensor or impact-responsive switch means for sensing an impact during the collision, both of which are connected to a suitable DC power supply such as a DC battery mounted on the vehicle body. There is, however, a fear of the actuator of the safety device not functioning properly due to shocks, jerks, vibrations and consequent physical breakage caused by cruising of the motor vehicle, resulting in the actuator, i.e., the safety device being inoperative in the event that the motor vehicle encounters a collision. For instance, the detonator, the switch means or the DC battery per se could be destroyed or broken down, or electric connectors for interconnecting electric elements in the actuator could be cut or disconnected from them so that an electric circuit of the actuator cannot be completed. Furthermore, there is a possibility of malfunctionally closing the switch means (the switch means is such as to be closed in response to the collision of the motor vehicle) prior to the collision. Accordingly, it is desired to detect such a failure or fault immediately after it takes place in the actuator of the safety device.

Conventionally, for this purpose, there has been provided in the actuator of a safety device a failure or fault detector of the type in which the detection of the fault condition of the actuator is accomplished by measuring voltages appearing at some particular points in the electric circuit of the actuator in the event that failure occurs therein, by picking up and comparing the measured voltages by means of comparators forming a logic circuit with their reference voltage so as to produce a logic circuit output signal therefrom, and by rendering a suitable alarm operative in response to the logic circuit output signal from the logic circuit, whereby the vehicle driver can perceive the failure or fault in the actuator through the alarm. The prior art fault detector generally is such that the alarm means continues its alarm operation in such a manner as to keep the lamp forming the alarm means on all through the fault condition, or for a predetermined period of time from the occurrence of the fault. As previously mentioned, the failures in the actuator mostly result from disconnections of the components employed, like the detonator or the switch means, due to shocks, jerks or vibrations during cruising of the motor vehicle. Consequently, it sometimes happens that the disconnected components are again interconnected therebetween due to another shock, jerk or vibration so as to correct the faulty condition accidentally. However, such a condition at the actuator is very temporary because the actuator is liable to develop again the faulty condition due to a further shock or vibration during cruising. As the result, the vehicle driver cannot confirm that the actuator is in such a temporarily operable condition which may actually be regarded as a faulty condition. To solve this problem, it is necessary that in the event a failure occurs in the actuator, the alarm never stops its operation, even though the faulty condition is corrected by chance thereafter; the actuator is then in an unstable condition. In other words, the pilot lamp of the alarm should be kept lighted unless the actuator will be completely fixed and repaired. However, as described above, the prior art fault detector is such as to stop its alarm operation if the faulty condition of the actuator is corrected by chance; this fault detector cannot detect such an unstable condition of the actuator. Thus, the prior art fault detector is inadequate and a serious problem remains to be solved, so that there is a continuing need for an improved fault or failure detector for an actuator of a safety device.

The present invention alleviates the disadvantage of the prior art by employing a fualt or failure recording or storing means which comprises an electric memory element such as an electric fuse and alarm which comprises a buzzer or a pilot lamp. The alarm is energized when the electric fuse is burnt out or melted in the event of the failure of the actuator, and then the pilot lamp is lighted so as to start its alarm operation. The pilot lamp will never stop its alarm operation until the melted fuse is replaced by a new one, even though failure or fault of the actuator could by chance be corrected temporarily thereafter for some cause or an other.

It is, therefore, a principal object of the present invention to provide an improved fault or failure detector for an actuator of a safety device for a motor vehicle.

Another object of the present invention is to provide an improved fault or failure detector which is capable of warning the vehicle driver of a faulty condition of an actuator of a safety device, even though the fault or failure in the actuator could be corrected by chance.

Still another object of the present invention is to provide an improved fault or failure detector which is capable of recording or storing a faulty or failed condition of an actuator of a safety device, once the fault or failure occurs.

A further object of the present invention is to provide an improved fault or failure detector which may detect a faulty or failed condition of an alarm forming a part of the fault detector.

A still further object of the present invention is to provide an improved fault or failure detector which is reliable in operation and simple in construction.

Figure 2:
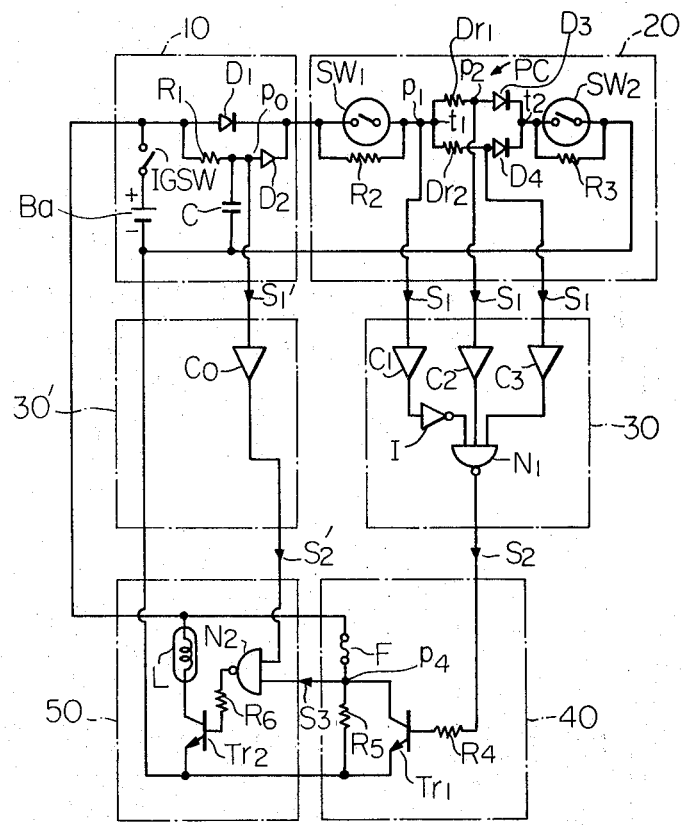

The foregoing and other objects of the present invention, the various features of the invention itself, may be more fully understood from the following description when read together with the accompanying drawing, in which:

FIG. 1 diagrammatically illustrates a preferred embodiment of the basic concept of the present invention in block form, and FIG. 2 is a schematic circuit diagram of the embodiment of the present invention shown in FIG. 1.

Referring more particularly to FIG. 1, reference numeral 10 designates an electric DC power supply which is adapted for energizing an actuator 20 of a safety device. In the event that there arises a fault or failure in the actuator 20, the actuator 20 produces an output signal $S_1$ indicative of the faulty or failed condition of the actuator 20. The output signal $S_1$ is supplied from the actuator 20 to a logic circuit 30 which functions to discriminate between the failed condition and a normal condition of the actuator 20. The logic circuit 30 produces a logic circuit output signal $S_2$ which is supplied to a fault or failure recording or storing means 40 which functions to record or store the fault or failure. The storing means 40 produces an output signal $S_3$ which is supplied to an alarm 50. On the other hand, an auxiliary power source of the DC power supply 10 produces an output signal $S_1'$ corresponding to the source voltage thereof. The output signal $S_1'$ is supplied to another logic circuit 30' which produces a logic circuit output signal $S_2'$. The signal $S_2'$ is supplied to the alarm 50. Thus, the alarm 50 is responsive to the two signals $S_2'$ and $S_3$ to start its alarm operation, so that the vehicle driver can perceive the faulty or failed condition of the actuator 20 by the energized alarm 50.

Reference is now made to FIG. 2 in which a preferred embodiment of a fault or failure detector of the invention is illustrated. In this embodiment, the electric DC power supply 10 broadly comprises a main power source such as a DC battery $Ba$ having a source voltage $Vb$ and an above-mentioned auxiliary power source such as a capacitor C. When an ignition switch IGSW is closed, current will flow from the battery $Ba$ into the actuator 20 through a diode $D_1$ which allows current to flow therethrough in only one direction, i.e., in the forward direction. The capacitor C as an auxiliary power source is charged through a resistor $R_1$ by the source voltage of the battery $Ba$ to a voltage substantially equal to the source voltage $Vb$. The capacitor C allows a discharge current to flow into the actuator 20 through a diode $D_2$.

Connected with the DC power supply 10 are first and second collision sensors or impact-responsive switch means $SW_1$ and $SW_2$ for sensing an impact resulting from a collision of the motor vehicle, both of which are such as to close in response to a collision of the motor vehicle. The switch means $SW_1$ and $SW_2$ are usually mounted on a collapsible protruding portion of the motor vehicle such as a bumper. The switch means $SW_1$ and $SW_2$ are shunted by resistors $R_2$ and $R_3$ having values of resistance, $r_2$ and $r_3$, respectively. In this instance, the value of resistance $r_2$ is substantially equal to $r_3$. Between the switch means $SW_1$ and $SW_2$ two electrically actuable detonators $Dr_1$ and $Dr_2$ are connected in series for firing an explosive charge to release pressurized gas from a gas reservoir (not shown) during a collision. The detonators $Dr_1$ and $Dr_2$ are connected in series with diodes $D_3$ and $D_4$, respectively, which allow current to flow therethrough in only one direction, from the positive to negative terminals of the DC power supply 10, i.e., in the forward direction. As shown, the detonators and diodes form a parallel circuit PC. The detonators $Dr_1$ and $Dr_2$ have values of resistance, $dr_1$ and $dr_2$, respectively which are rather lower than those of the resistors $R_2$ and $R_3$; that is, there is a relationship between them that $r_2 = r_3 >> dr_1$ or $dr_2$. The value of resistance, $dr_1$ or $dr_2$, is generally less than 10 ohms, but usually approximately 1 ohm. The parallel circuit PC has one common terminal $t_1$ connected to one terminal of the first switch means $SW_1$ and the other common terminal $t_2$ connected to one terminal of the second switch means $SW_2$.

In the logic circuit 30, three comparators designated by $C_1$, $C_2$ and $C_3$ are connected to points $P_1$, $P_2$ and $P_3$ in the actuator 20. Each comparator serves to pick up and compare the voltage level at the respective point so as to produce a logic output signal. The comparators $C_1$, $C_2$ and $C_3$ have reference voltage levels, in this embodiment, two-thirds $Vb$, one-third $Vb$ and one-third $Vb$ respectively; the comparators are such as to produce a logic "0" output signal if the respective input signal has a voltage level lower than the reference voltage level and, in turn, to produce a logic "1" output signal if the respective input signal has a voltage level higher than the reference voltage level. The output of the comparator $C_1$ is connected to an invertor I for inverting the logic output signal of the compator $C_1$. An output of the invertor I is connected to one input of a NAND gate $N_1$. On the other hand, the comparators $C_2$ and $C_3$ are directly connected to the other inputs of the NAND gate $N_1$. The NAND gate $N_1$ is connected to a fault or failure recording or storing means 40.

The fault or failure storing means 40 comprises a transistor $Tr_1$ the base of which is connected through a resistor $R_4$ to the output of the logic circuit 30, the emitter connected to the negative terminal of the DC power supply 10, the collector connected to the positive terminal of the DC power supply 10 through an electric fuse as an important element forming the storing means 40, and a resistor $R_5$ connected between the emitter and the collector of the transistor $Tr_1$. An output of the storing means 40, i.e., a junction $p_4$ between the fuse and the resistor $R_5$ is connected to an input of the alarm 50.

The alarm 50 comprises a NAND gate $N_2$, a transistor $Tr_2$ the base of which is connected through a resistor $R_6$ to an output of the NAND gate $N_2$, and an indicator L such as a buzzer or a lamp which is connected through the emitter and the collector of the transistor $Tr_2$ to the DC power supply 10. The lamp is usually arranged on an instrument panel of the motor vehicle.

On the other hand, the NAND gate $N_2$ is connected to an output of the logic circuit 30' comprising a comparator $C_0$, an input of which is connected to a point $p_0$ corresponding to a junction between the capacitor C as an auxiliary power source and the diode $D_2$. The comparator $C_0$ serves to pick up and compare a voltage level at the point $p_0$, i.e., a level of the voltage charged by the source voltage of the battery $Ba$ with its reference voltage level so as to produce a logic output signal. The comparator $C_0$ has a reference voltage level, in this embodiment, two-thirds $Vb$; the comparator $C_0$ is such as to produce a logic "0" output signal if its input signal has a voltage level higher than the reference voltage level two-thirds $Vb$.

When, in operation, the ignition switch IGSW is closed, the battery $Ba$ starts its charging operation of the capacitor C as an auxiliary power source. At the start, the charging voltage for the capacitor C does not yet reach the reference voltage level two-thirds $Vb$ of the comparator $C_0$ so that there appears at the points $p_0$ a voltage level lower than the reference voltage level two-thirds $Vb$ of the comparator $C_0$. The lower voltage level at the point $p_0$ is detected by the comparator $C_0$ so that the comparator $C_0$ produces a logic "0" output signal $S_2'$ which is supplied to an input of the NAND gate $N_2$. As is appreciated by those skilled in the art of logic design, with the logic "0" signal $S_2'$ supplied to the input, there appears at its output a logic "1" output signal which is supplied through the resistor $R_6$ to the base of the transistor $Tr_2$, resulting in the transistor $Tr_2$ becoming conductive so that the indicator L, i.e., the lamp is lighted. However, the lamp is shut off when the capacitor C is charged to a voltage higher than the reference voltage level two-thirds $Vb$ of the comparator $C_0$ because the comparator $C_0$ produces a logic "1" output signal $S_2'$. From the foregoing, it is to be noted that it is possible not only to detect a fault or failure of the indicator L, i.e., the alarm 50, but also to detect a fault or failure of the capacitor C, i.e., the DC power supply 10.

On the other hand, when the actuator 20 is normal with the switch means $SW_1$ and $SW_2$ open, any of voltages appearing at the points $p_0$, $p_1$ and $p_2$ is substantially equal to half the source voltage, i.e., one-half $Vb$, since there is a relationship between the resistors $R_2$ and $R_3$ and the detonators $Dr_1$ and $Dr_2$ that $r_2 = r_3 >> dr_1$ or $dr_2$, as previously mentioned. The voltage levels of one-half $Vb$ at the points $p_1$, $p_2$ and $p_3$ are detected by the corresponding comparators $C_1$, $C_2$ and $C_3$ so as to be compared with their respective reference voltage levels. The comparator $C_1$ then produces a logic "0" output signal and either one of the comparators $C_2$ and $C_3$ produces a logic "1" output signal. The logic "0" output signal of the comparator $C_1$ is inverted by the invertor I so that a logic "1" output signal is applied from the invertor I to one input of the NAND gate $N_1$. The logic "1" output signals of the comparators $C_2$ and $C_3$ are directly applied to the other inputs of the NAND gate $N_1$. The NAND gate $N_1$ produces a logic "0" output signal which is supplied through the resistor $R_4$ to the base of the transistor $Tr_1$ so that the transistor $Tr_1$ is rendered nonconductive. Then, since current does not flow from the positive to negative terminals of the power supply 10 through the electric fuse F and the transistor $Tr_1$, but flows through the fuse F and the resistor $R_5$, the fuse F is not burnt out or melted due to the current because of the provision of the resistor $R_5$. Thus, a signal having the voltage level at point $p_4$ in the storing means 40 is supplied to one input of the NAND gate $N_2$; a logic "1" output signal is supplied from the storing means 40 to the NAND gate $N_2$ of the alarm 50. Since the logic "1" signal is supplied from the comparator $C_0$ to the other input of the NAND gate $N_2$, as mentioned above, the NAND gate $N_2$ produces at its output a logic "0" output signal which is supplied through the resistor $R_6$ to the base of the transistor $Tr_2$, rendering the transistor $Tr_2$ nonconductive. As a result, the lamp stays off so that the vehicle driver can confirm the normal condition of the actuator of the safety device.

The operation of the fault or failure detector in the event that a fault or failure occurs in the actuator will be discussed below. First, if the switch means $SW_1$ closes malfunctionally although the vehicle does not encounter a collision, the voltage appearing at the point $p_1$ will change its level from one-half $Vb$ to $Vb$, i.e., the source voltage of the power supply 10. Second, if the switch means $SW_2$ closes likewise, both voltages at the points $p_2$ and $p_3$ will change their levels from one-half $Vb$ to zero. Thirdly, if the detonator $Dr_1$ is broken down or disconnected from the diodes or the switch means, the voltage appearing at the point $p_1$ will change its level from one-half $Vb$ to zero. The same will apply to the detonator $Dr_2$. Finally, if all of the faults or failures mentioned above occur simultaneously in the actuator, any of the voltages at the points $p_1$, $p_2$ and $p_3$ will become zero. In any case mentioned above, it will be appreciated by those skilled in the art that the NAND gate $N_1$ then produces a logic "1" output signal $S_2$ which is applied through the resistor $R_4$ to the base of the transistor $Tr_1$, rendering the transistor conductive. At this time, a complete electric circuit formed by the fuse, the conductive transistor $Tr_1$ and the battery $Ba$ is established so that a high voltage current flows through the fuse F, resulting in the fuse F being burnt out or melted. Then, the voltage appearing at the point $p_4$ is nought, that is, a logic "0" output signal $S_3$ is supplied from the storing means 40 to the input of the NAND gate $N_2$. Since the logic "1" signal $S_2'$ is supplied from the comparator $C_0$ to the other input of the NAND gate $N_2$, the NAND gate $N_2$ produces at its output a logic "1" output signal which is supplied through the resistor $R_6$ to the base of the transistor $Tr_2$, rendering the transistor $Tr_2$ conductive. As the result, the lamp is lighted so that the vehicle driver can easily perceive the faulty condition of the actuator of the safety device at a glance of the glowing lamp immediately after the fault or failure occurs in the actuator.

In this connection, it should be appreciated that once a fault or failure occurs in the actuator, the lamp, i.e., the indicator L never stops its alarm operation so long as the melted fuse is not replaced by a new one, even though the actuator could accidentally temporarily recover from the faulty condition due to shocks or vibrations of the motor vehicle while travelling.

Many modification may be made to the circuitry arrangement in the embodiment of the present invention as shown in FIG. 2. For instance, it will be appreciated that in the fault or failure storing means a semiconductor memory element such as one able to store the fact that a certain voltage is established thereacross, can be employed instead of the electric fuse. Additionally, in order to eliminate an electric noise occurring when the memory element stores the faulty condition, an integrating circuit can be employed so as to set a delay time.

In view of the many modified forms which are applicable to the specific embodiment shown in FIG. 2, it is the object of the appended claims to cover all such variations which come within the true scope of the present invention.

What is claimed is:

1. A fault detector for an actuator of a safety device for a motor vehicle having an electrical DC power supply, which comprises: a logic circuit comprising a plurality of comparators responsive to internal signals in an electrical circuit of a safety device actuator, an inverter receptive of a logic output signal of one of said comparators, and a first NAND gate receptive of logical output signals of said inverter and the remaining ones of said comparators to develop a logic circuit output signal; a fault memory means for developing a continuous output signal in response to a logic circuit output signal representative of a fault in the safety device actuator; and an alarm actuated in response to said output signal from said memory means.

2. A fault detector as claimed in claim 1, further comprising an additional logic circuit for detecting a source voltage of an auxiliary power source of said power supply, said additional logic circuit developing a logic output signal indicative of an auxiliary power source fault, and means applying said additional logic circuit output signal to said alarm.

3. A fault detector as claimed in claim 2, in which said additional logic circuit comprises a comparator.

4. A fault detector as claimed in claim 1, in which said fault memory means comprises a first transistor, a first resistor connected between the base of said first transistor and the output of said first NAND gate, means connecting the emitter of said first transistor to one terminal of said power supply, a memory element, means connecting the collector of said first transistor in series with said memory element to another terminal of said power supply, and a second resistor connected between said emitter and said collector.

5. A fault detector as claimed in claim 4, in which said memory element is an electrical fuse.

6. A fault detector as claimed in claim 2, in which said alarm comprises a second transistor, a third resistor connected between the base of said second transistor and a junction of said memory device and said second resistor, means connecting the emitter of said second transistor to one terminal of said power supply, an indicator, and means connecting the collector of said second transistor in series with said indicator to another terminal of said power supply.

7. A fault detector as claimed in claim 6, in which said indicator is a lamp.

8. A fault detector as claimed in claim 6, in which said alarm further comprises a second NAND gate having two inputs, means applying to one of said inputs an output of said additional logic circuit, and means applying to the other input an output of said memory means, and means connecting an output of said second NAND gate in series with said second resistor to said base of said second transistor.

* * * * *